(12) United States Patent
Sakaguchi (10) Patent No.: US 8,295,571 B2
(45) Date of Patent: Oct. 23, 2012

(54) THREE-DIMENSIONAL IMAGE PROCESSING APPARATUS

(75) Inventor: Takuya Sakaguchi, Shioya-gun (JP)

(73) Assignees: Kabushiki Kaisha Toshiba, Tokyo (JP); Toshiba Medical Systems Corporation, Otawara-shi (JP)

(*) Notice: Subject to any disclaimer, the term of this patent is extended or adjusted under 35 U.S.C. 154(b) by 564 days.

(21) Appl. No.: 12/574,305

(22) Filed: Oct. 6, 2009

(65) Prior Publication Data

US 2010/0086190 A1   Apr. 8, 2010

(30) Foreign Application Priority Data

Oct. 7, 2008   (JP) ................. 2008-260767

(51) Int. Cl.
*G06K 9/00*   (2006.01)
*A61B 6/00*   (2006.01)

(52) U.S. Cl. ............. 382/128; 382/131; 382/132; 378/4

(58) Field of Classification Search .................. 382/128, 382/131, 132; 378/4
See application file for complete search history.

(56) References Cited

U.S. PATENT DOCUMENTS

| | | | |
|---|---|---|---|
| 5,313,513 A * | 5/1994 | Prindiville et al. | 378/4 |
| 5,483,567 A * | 1/1996 | Swerdloff | 378/4 |
| 5,500,883 A * | 3/1996 | Hsiao et al. | 378/4 |
| 5,940,527 A * | 8/1999 | Takeo | 382/132 |
| 6,002,738 A * | 12/1999 | Cabral et al. | 378/4 |
| 6,782,284 B1 * | 8/2004 | Subramanyan et al. | 600/407 |
| 8,180,130 B2 * | 5/2012 | Sebok | 382/128 |
| 2005/0220264 A1 | 10/2005 | Homegger | |
| 2008/0137934 A1 | 6/2008 | Sakaguchi et al. | |
| 2009/0052613 A1 | 2/2009 | Sakaguchi et al. | |

FOREIGN PATENT DOCUMENTS

JP   2005-288164   10/2005

* cited by examiner

*Primary Examiner* — Alexander H Taningco
(74) *Attorney, Agent, or Firm* — Oblon, Spivak, McClelland, Maier & Neustadt, L.L.P.

(57) ABSTRACT

Image data of a three-dimensional region of a medical device placed in a subject body is stored in an image data storage section. An image creating section extracts pixels corresponding to an image of a medical device on the basis of the distribution of pixel values along a plurality of radial rays, which spreads from the axis side of the medical device on a plurality of sectional images perpendicular to the axis of the medical device, using the image data stored in the image data storage section and creates image data, in which the medical device spreads, by distributing the extracted pixels in a flat surface region corresponding to the axis direction and the angular direction of the radial ray.

17 Claims, 6 Drawing Sheets

THREE-DIMENSIONAL IMAGE PROCESSING APPARATUS

CROSS-REFERENCE TO RELATED APPLICATIONS

This application is based upon and claims the benefit of priority from prior Japanese Patent Application No. 2008-260767, filed Oct. 7, 2008, the entire contents of which are incorporated herein by reference.

BACKGROUND OF THE INVENTION

1. Field of the Invention

The present invention relates to a three-dimensional image processing apparatus which processes data of a three-dimensional image relating to a medical device.

2. Description of the Related Art

For example, JP-A-2005-288164 proposes a technique of reconstructing and displaying a local region, such as a stent, in a three-dimensional manner during cardiovascular intervention. While observing such a three-dimensional image, a doctor formulates a strategy for the next procedure to progress the treatment. For example, in order to place a stent in the bifurcation, a stent is disposed in the main tube, and then a guide wire is inserted into a branching blood vessel and a stent strut is expanded. In this manner, the blood is made to flow to the bifurcation without resistance. In the known three-dimensional image display methods, such as MIP (Maximum Intensity Projection), MPR (Multi Planar Reformation), VR (Volume Rendering), and slicing, it is difficult to observe the spread condition of the stent strut described above. Accordingly, a solution, such as displaying the stent while rotating it as a moving image, is required.

As described above, since it is difficult to observe the spread condition of a stent strut in the known three-dimensional image display methods, there are problems in that a solution, such as displaying the stent while rotating it as a moving image, is required and this takes time during an operation.

BRIEF SUMMARY OF THE INVENTION

In view of the above, it is an object of the present invention to provide a three-dimensional image processing apparatus capable of easily observing the shape of a medical device or the like placed in a subject body.

According to an aspect of the present invention, there is provided a three-dimensional image processing apparatus including: a storage section that stores image data of a three-dimensional region of a medical device placed in a subject body; an extraction section that extracts pixels corresponding to the image of the medical device on the basis of the distribution of pixel values along a plurality of radial rays, which spreads from an axis side of the medical device on a plurality of sectional images perpendicular to the axis of the medical device, using the data of the image; and a creation section that creates image data, in which the medical device is spread, by distributing the extracted pixels in a flat surface region corresponding to the axis direction and the angular direction of the radial ray.

According to another aspect of the present invention, there is provided a three-dimensional image processing apparatus including: a storage section that stores image data of a three-dimensional region of a medical device placed in a subject body; an extraction section that extracts pixels corresponding to the image of the medical device on the basis of the distribution of pixel values along a plurality of radial rays, which spreads from an axis side of the medical device on a plurality of sectional images perpendicular to the axis of the medical device, using the data of the image; a detection section that detects the distance from the axis to the position at which the pixel is extracted; and a creation section that creates image data, in which the medical device is spread, by distributing the pixels with a pixel value corresponding to the detected distance in a flat surface region corresponding to the axis direction and the angular direction of the radial ray.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, a three-dimensional image processing apparatus according to the present invention will be described with reference to the accompanying drawings. Moreover, in the following embodiments, explanation will be made assuming that a three-dimensional image processing apparatus is provided in an X-ray photographing apparatus.

Figure 1:
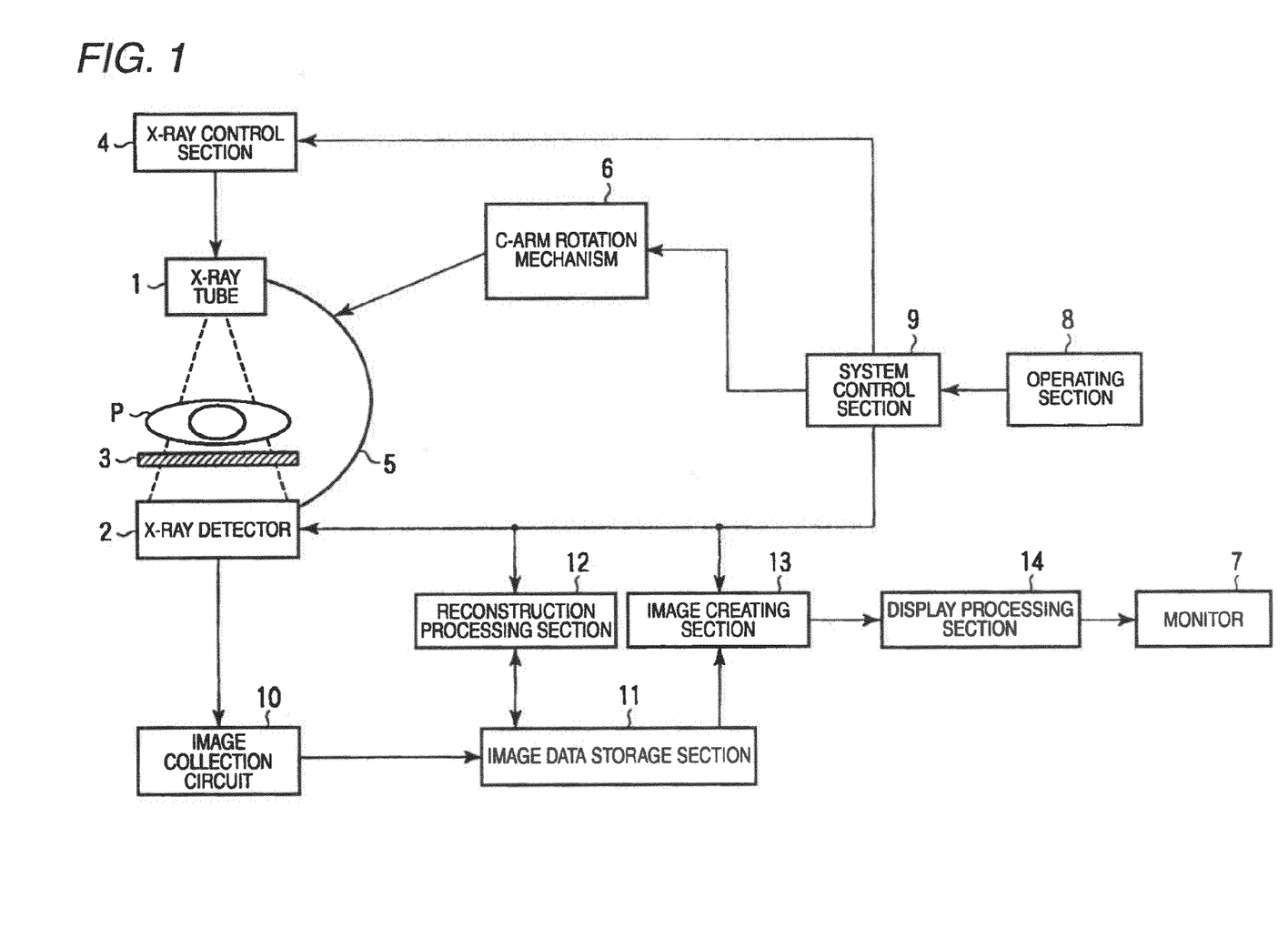
FIG. 1 is a view illustrating an embodiment of an X-ray photographing apparatus including a three-dimensional image processing apparatus according to the present invention.

FIG. 1 is a block diagram illustrating an X-ray photographing apparatus including a three-dimensional image processing apparatus according to an embodiment of the present invention. The X-ray photographing apparatus has a C arm 5. The C arm 5 is supported to be able to rotate around the three perpendicular axes by means of a floor or a ceiling support mechanism (not shown). An X-ray tube 1 is fixed to one end of the C arm 5. In order to generate an X-ray from the X-ray tube 1, an X-ray control section 4 applies a tube voltage between electrodes of the X-ray tube 1 and supplies a heating current to a negative-electrode filament of the X-ray tube 1 according to the control of a system control section 9. An X-ray detector 2 is fixed to the other end of the C arm 5. The X-ray tube 1 and the X-ray detector 2 face each other with a subject body P on a table top 3 interposed therebetween. The X-ray detector 2 is formed by combination of an image intensifier and a TV camera, for example. Alternatively, the X-ray detector 2 is formed by a flat panel detector (FPD: flat panel detector) having semiconductor detecting elements arrayed in a matrix. In order to rotate the C arm 5, a C-arm rotation mechanism 6 supplies electric power to the driving source according to the control of the system control section 9. By repeatedly photographing while the C arm 5 is rotating, X-ray images (projected images) from the large number of directions required for three-dimensional image reconstruction can be acquired.

The rotation of the C arm 5, the application of a high voltage to the X-ray tube 21, and the signal reading of the X-ray detector 2 are controlled by the system control section 9, and the data of a plurality of projected images with different photographing directions is collected by an image collection circuit 10. In addition, in this X-ray photographing apparatus, an electrocardiograph is provided to generate an electrocardiography by measuring the subject body P. An image data storage section 11 stores the data of the plurality of projected images, which is collected by the image collection circuit 10, so as to correspond with the data in the photographing direction.

A reconstruction processing section 12 reconstructs the volume data on the basis of a plurality of projected images which is photographed from different directions and is stored in the image data storage section 11. In the present embodiment, the data of a plurality of slice images at continuous positions regarding a stent which is placed in the target position during the intravascular intervention is stored in the image data storage section 11.

An operating section 8 is provided in order to transmit various commands from the user to the system control section 9 and has various input devices, such as a keyboard and a mouse. A monitor 7 is formed by a CRT (cathode-ray tube), a liquid crystal display (LCD), or the like.

Figure 2:
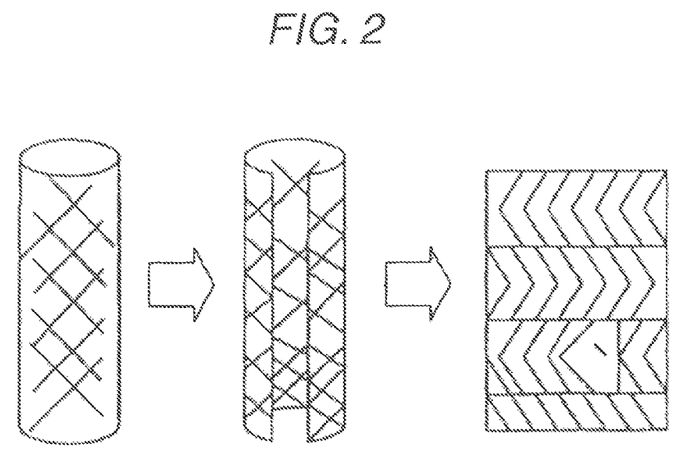
FIG. 2 is a view illustrating a spread image of a stent.

Moreover, in the present embodiment, an image creating section 13 and a display processing section 14 are provided in order that the spread condition of a stent strut is easily observed. The image creating section 13 creates the data of a spread image, in which a cylindrical stent spreads in the flat surface shape, on the basis of the volume data stored in the image data storage section 11, as shown in FIG. 2. The display processing section 14 displays on the monitor 7 the spread image of the stent created by the image creating section 13.

Hereinafter, processing of the image creating section 13 and display processing section 14 will be specifically described according to each embodiment.

(First Embodiment)

In a first embodiment, a method of creating the image data, in which a stent spreads, on the basis of the maximum pixel value on a radial ray from the center of a stent image on each slice image, will be described.

Figure 3:
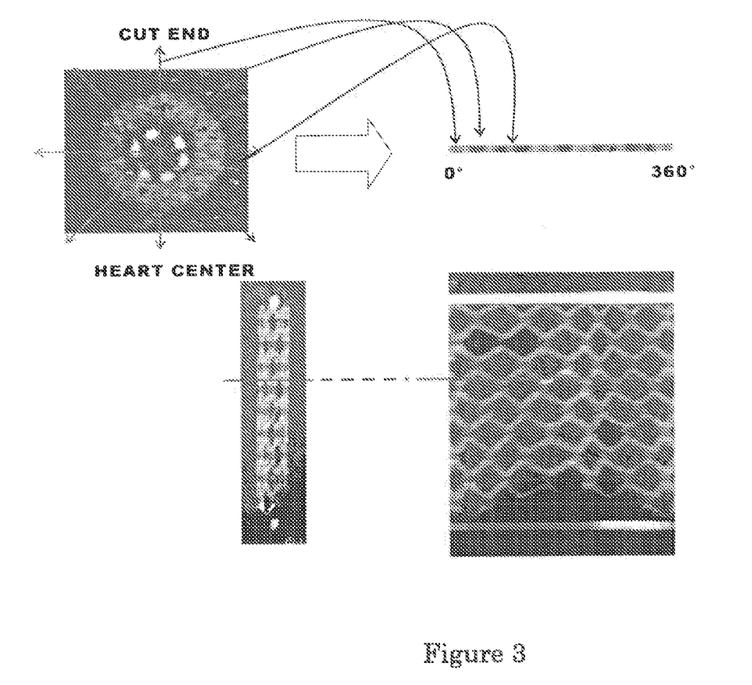
FIG. 3 is a view illustrating an operation in a first embodiment.
Figure 4:
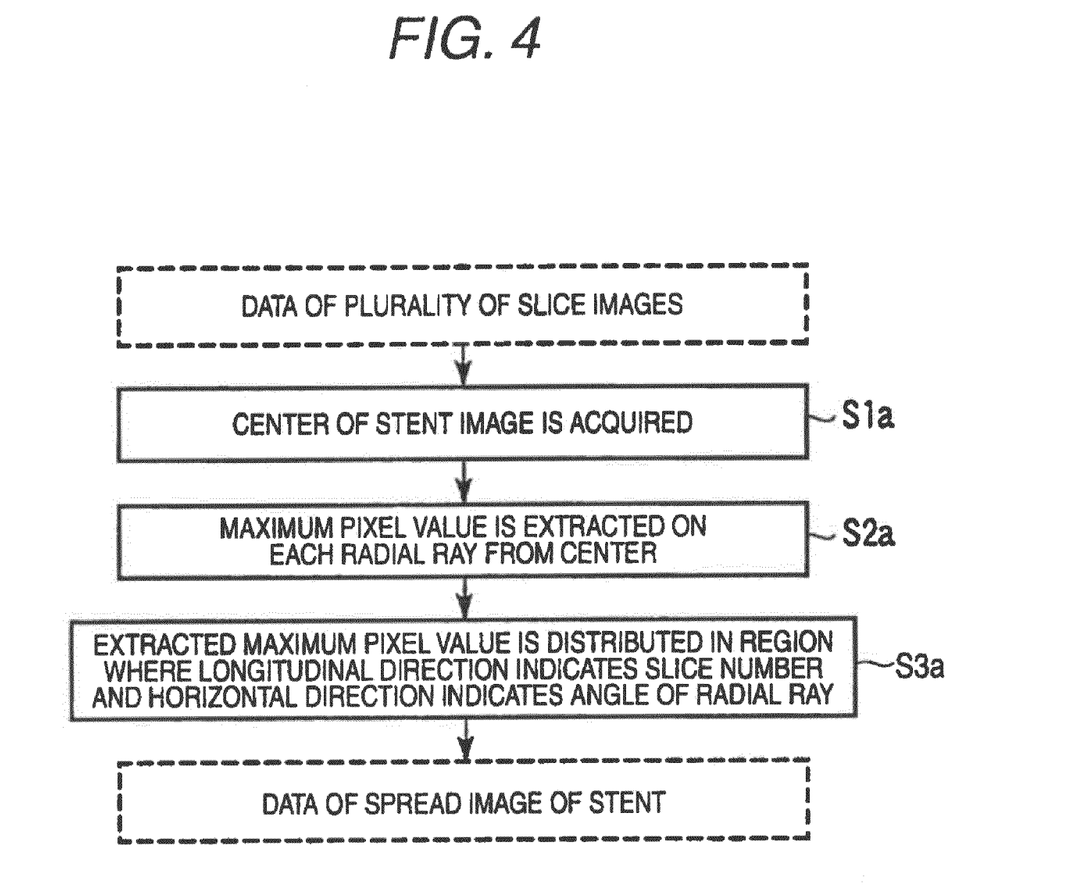
FIG. 4 is a flow chart illustrating procedures of image processing in the first embodiment.

FIG. 3 is a view illustrating an operation in the first embodiment. FIG. 4 is a flow chart illustrating procedures of image processing in the first embodiment.

Referring to FIG. 4, the image creating section 13 acquires the center of a stent image on each slice image (step S1a). For example, when a guide wire passes through the stent center in the three-dimensional image of the stent, the center of the stent image can be found by using the guide wire as the axis. In addition, since markers through which an X-ray is not transmitted exist on both sides of a balloon for expanding a stent, the center of the stent can also be found using a straight line, which connects the markers, as the axis. Alternatively, the center of a stent image on each slice image may be found by using an image processing algorithm.

Then, the image creating section 13 supposes a plurality of radial rays from the center of the stent image and extracts the maximum value (minimum value in the case of a black inverted image) of brightness within the predetermined distance from the center on each radial ray (step S2a). The predetermined distance is set to about twice the stent radius assumed. For example, since the diameter of a stent used for the heart is 2 to 5 mm, the predetermined distance is set to 5 mm. This range may be arbitrarily changed.

Then, the image creating section 13 creates the image data in which the extracted maximum brightness value is distributed in a region where the longitudinal direction indicates a slice number and the horizontal direction indicates the angle of each radial ray (step S3a). An example of the spread image of the stent created as described above is shown on the lower right side in FIG. 3. As shown in FIG. 3, if the extraction processing is performed once for every entire perimeter of 360° and the maximum brightness values acquired for every angle of a radial ray are arrayed in the horizontal direction, an image corresponding to one line of 360 pixels wide×1 pixel long is created as shown on the upper right side in FIG. 3. The image creating section 13 performs this processing for all slices, which are perpendicular to the axis of the stent, in the three-dimensional image. By stacking images for the respective slices, each of which has one line, in slice number order in the longitudinal direction, the data of the spread image of the stent in which the extracted maximum brightness values are arrayed in order of 0 to 360° in the horizontal direction and in slice number order in the longitudinal direction is created as shown on the lower right side in FIG. 3.

The display processing section 14 displays the created spread image of the stent on the screen of the monitor 7. For example, as shown on the lower side in FIG. 3, an MIP image of the three-dimensional image and the created spread image are displayed side by side. In addition, when a user places a mouse pointer on the spread image using the operating section 8, a mark is displayed at the corresponding position of the MIP image.

As stated above, the image creating section 13 in the first embodiment extracts pixels corresponding to an image of a stent on the basis of the distribution of pixel values along a plurality of radial rays, which spreads from the axis side on a plurality of slice images perpendicular to the axis of the stent, and creates an image in which the extracted pixels are distributed in a flat surface region corresponding to the axis direction and the angular direction of the radial ray. That is, according to the first embodiment, it becomes possible to display a spread image, in which a stent spreads in a flat surface shape, on the basis of a three-dimensional image of the stent. In this manner, the doctor can observe the shape of a stent in detail. As a result, the spread condition, which was difficult to check on the three-dimensional display in the related art, can be easily observed.

In addition, although the gap between the angles of radial rays is set to 1° in the first embodiment, it may be set to any value, such as 10° or 0.1°. In addition, in the first embodiment, the maximum brightness value is extracted. However, when the maximum value of the brightness is set to 100%, a pixel with a brightness of about 90% may also be extracted in order to avoid a noise. That is, a pixel corresponding to an image of a stent is extracted on the basis of the distribution of the pixel values along the radial ray. In addition, when a guide wire passes through the center of the stent, a predetermined range from the axis is excluded such that pixels of a portion corresponding to the guide wire are not included in the extraction range of the maximum value. Specifically, 0.5 mm from the center of the stent is excluded from the calculation, for example.

In addition, although the horizontal direction is used for the angle on the created spread image, the longitudinal direction and the horizontal direction may be opposite or may be set to be inclined. In addition, the scale of a spread image in the horizontal and vertical directions may be set arbitrarily. Both ends (cut ends) of the spread image may be set in any direction. However, it is preferable to cut the ends from the most distant direction (opposite side to a central portion of an organ) from the center of an organ. Doing this will result in even better visibility since the desired portion (treated portion) is displayed at the center on the spread image of the stent. In the first embodiment, the case where there is one stent has been described. However, the first embodiment may also be applied to the case where two stents are connected in series. In this case, it is preferable to allow a user to designate the calculation range in the axis direction.

(Second Embodiment)

In a second embodiment, a method of extracting the maximum pixel value similar to the first embodiment and creating the image data, in which a stent spreads on the basis of the pixel value corresponding to the distance from the center of a stent image to the extraction position of the maximum pixel value, will be described.

Figure 5:
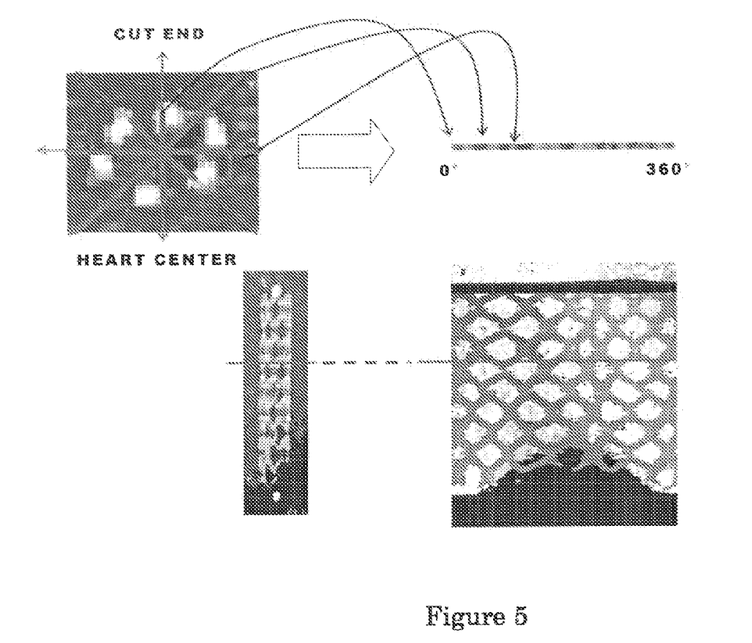
FIG. 5 is a view illustrating an operation in a second embodiment.
Figure 6:
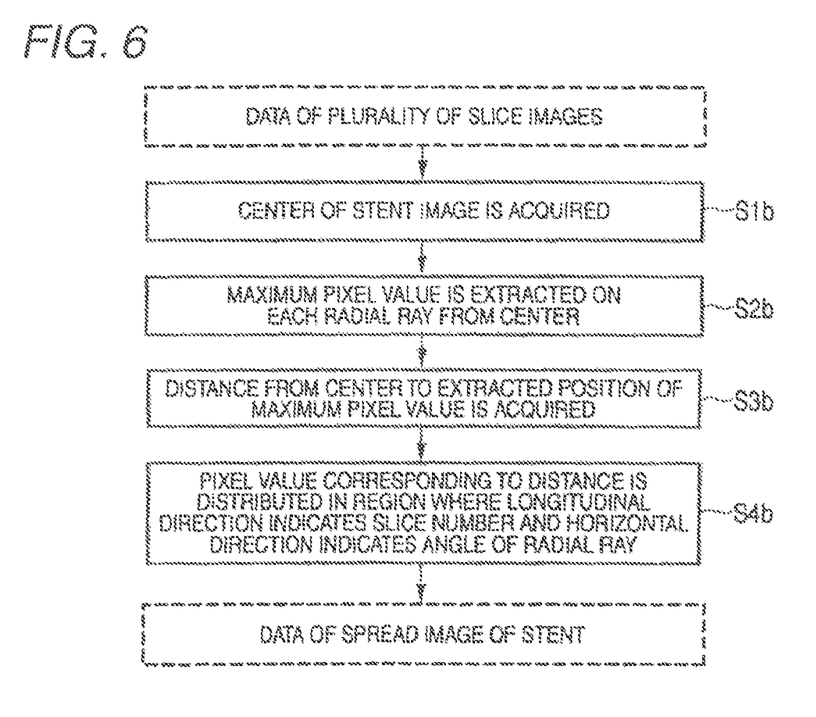
FIG. 6 is a flow chart illustrating procedures of image processing in the second embodiment.

FIG. 5 is a view illustrating an operation in the second embodiment. FIG. 6 is a flow chart illustrating procedures of image processing in the second embodiment.

Referring to FIG. 6, the image creating section 13 acquires the center of a stent image on each slice image similar to the first embodiment (step S1b). Then, the image creating section 13 supposes a plurality of radial rays from the center of the acquired stent image and extracts the maximum brightness value (or minimum value) within the predetermined distance from the center on each radial ray (step S2b).

Then, the image creating section 13 calculates the distance from the center of the stent image to the extraction position of the maximum brightness value (step S3b). Then, the image creating section 13 generates the image data in which the brightness value corresponding to the distance is distributed in a region where the longitudinal direction indicates a slice number and the horizontal direction indicates the angle of each radial ray (step S4b).

That is, the image creating section 13 in the second embodiment extracts pixels corresponding to an image of a stent on the basis of the distribution of pixel values along a plurality of radial rays from the axis side on a plurality of slice images perpendicular to the axis of the stent, and creates an image in which pixels having pixel values corresponding to the distance from the axis to the extraction position of the pixel are distributed in a flat surface region corresponding to the axis direction and the angular direction of the radial ray.

As shown in FIG. 5, the spread image of the stent created as described above becomes black in a place where the stent strut is close to the center as the distance becomes short, becomes white as it becomes distant from the center, and becomes pure white in a gap portion without a strut as the distance is increased. The doctor can observe the spread condition of the stent strut in detail by paying attention to the black-and-white gradient.

In addition, the black and white of the created spread image may be opposite. That is, the display may become whiter as the distance from the center to the strut is decreased. Alternatively, black and white may be displayed as pseudo colors for color display. In the case of color display, for example, the color is not given if the difference is less than 0.2 mm but is given if the difference is equal to or larger than 0.2 mm.

In addition, the display processing section 14 displays the distance numerically when the operator places a mouse pointer on the strut on the spread image displayed on the monitor 7. For example, it is displayed like '1.8 mm', and this is equivalent to the radius from the central axis of the stent to the strut. In addition, when the operator inputs a reference value, the difference between the distance and the reference value is displayed as an image. For example, when '1.5 mm' is input as a target radius for stent expansion, if the distance at a certain place is 1.8 mm, the difference of 0.3 mm is displayed on the image. Or, the difference is displayed in reddish color when the difference is shorter than the reference value, and the difference is displayed in bluish color when the difference is longer than the reference value. In this way, since it becomes easy to observe the difference between the distance and the target expansion value, it becomes possible to easily determine whether or not the expansion is sufficient.

Figure 7:
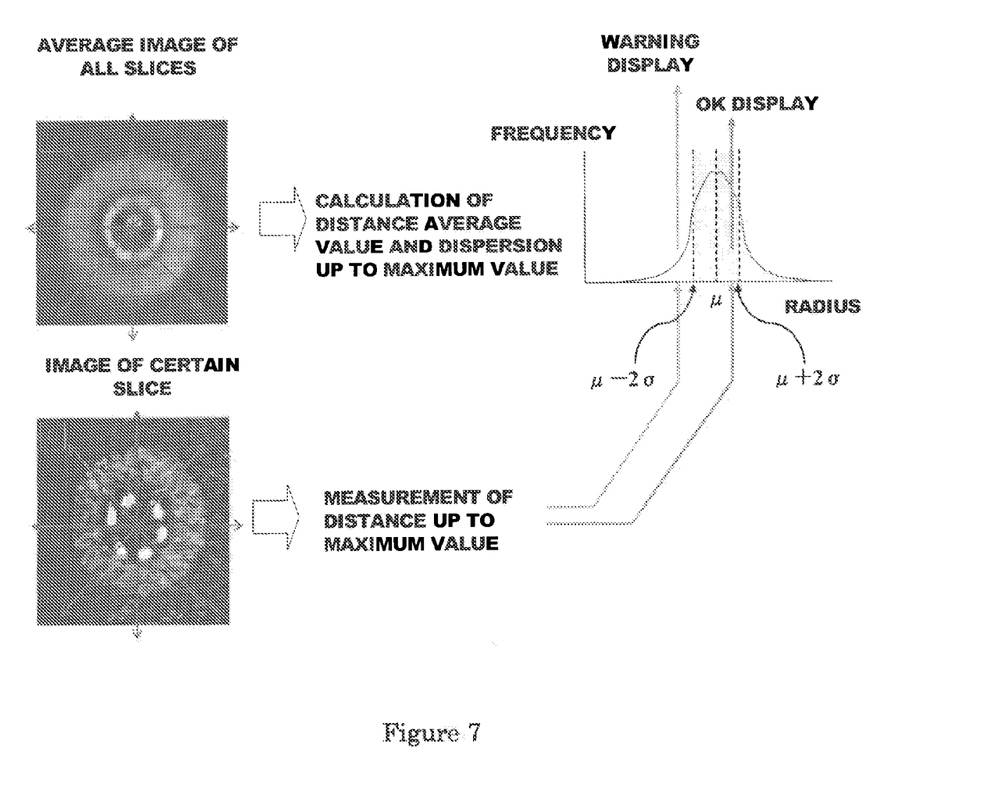
FIG. 7 is a view illustrating a display example of the index regarding the stent shape.

Moreover, regarding the abnormal value of the distance from the stent center to the strut, the distribution of the distances in all slices of the stent is calculated and the average $\mu$ and the deviation $\sigma$ are calculated, as shown in FIG. 7. For example, if a certain place is equal to or larger than $2\sigma$, the place may be determined to be abnormal.

In addition, the display processing section 14 displays the area for every gap (gap portion) of the mesh of each strut when the operator moves a mouse pointer on the spread image of the stent displayed on the monitor 7. This is very useful in the vascular bifurcation, for example, because the area is equivalent to the opening area of the strut. In addition, when the opening area of the strut is abnormal, the portion is displayed in color as a warning. In order to determine whether the opening area is abnormal, the mean area and deviation in the entire spread image of the stent are calculated. If the place is abnormally narrow or wide, warning display is performed.

Regarding the spread image of a stent created in the first or second embodiment, one image can be created for one volume data. Accordingly, since it becomes unnecessary to display the stent as a moving image, the entire stent can be observed as a still image. In addition, it becomes easy to confirm the overlap condition when two stents are arrayed in series. In addition, a calcified portion may be easily confirmed. Further, utilization as a report, such as printing the created spread image and attaching the printed matter on the medical chart, becomes possible.

In addition, the present invention is not limited to the above-described embodiments. In addition to the case where there is one stent, the above-described embodiments may also be used in the case where two stents are connected in series or a stent is disposed in the bifurcation, for example. In addition, although the above-described embodiments are particularly useful in a stent, it is needless to say that they can also be applied to other medical devices, such as a balloon.

Although the X-ray image for circulatory organs was used for explanation in the above embodiments, the embodiments are not limited to the X-ray image, and the range of the embodiments may be extended to medical images collected in other systems, such as a CT image, an MRI image, and an ultrasonic image.

In the above embodiments, the three-dimensional image processing apparatus according to the present invention was described using a configuration where the three-dimensional image processing apparatus was united with the X-ray photographing apparatus. However, the three-dimensional image processing apparatus may be configured separately and independently as a three-dimensional image processing apparatus including an image data storage section, an image creating section, a display processing section, and a monitor.

In addition, each of the functions in the present embodiments may be realized by installing a program, which is used to execute the corresponding processing, in a computer, such as a workstation, and then loading the program into a memory. In this case, a program capable of causing a computer to execute a corresponding technique may be distributed in a state where the program is stored in a recording medium, such as a magnetic disk (for example, a floppy (registered trademark) disk or a hard disk), an optical disk (for example, a CD-ROM or a DVD), and a semiconductor memory.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A three-dimensional image processing apparatus comprising:
a storage section that stores image data of a three-dimensional region of a medical device placed in a subject body;
an extraction section that extracts pixels corresponding to the image of the medical device on the basis of the distribution of pixel values along a plurality of radial rays, which spreads from an axis side of the medical device on a plurality of sectional images perpendicular to the axis of the medical device, using the data of the image; and
a creation section that creates image data, in which the medical device is spread, by distributing the extracted pixels in a flat surface region corresponding to the axis direction and the angular direction of the radial ray.

2. The apparatus according to claim 1,
wherein the extraction section extracts a pixel with a maximum or minimum image value on the radial ray.

3. The apparatus according to claim 1,
wherein the extraction section excludes a predetermined range from the axis from an extraction range of the pixels on the sectional image.

4. The apparatus according to claim 1,
wherein the creation section creates image data in which the medical device is cut from the opposite side of a central portion of the organ of the subject body.

5. The apparatus according to claim 1, further comprising:
a display section that displays the created image together with the image of the three-dimensional region of the medical device.

6. A three-dimensional image processing apparatus comprising:
a storage section that stores image data of a three-dimensional region of a medical device placed in a subject body;
an extraction section that extracts pixels corresponding to the image of the medical device on the basis of the distribution of pixel values along a plurality of radial rays, which spreads from an axis side of the medical device on a plurality of sectional images perpendicular to the axis of the medical device, using the data of the image;
a detection section that detects the distance from the axis to the position at which the pixel is extracted; and
a creation section that creates image data, in which the medical device spreads, by distributing the pixels with a pixel value corresponding to the detected distance in a flat surface region corresponding to the axis direction and the angular direction of the radial ray.

7. The apparatus according to claim 6,
wherein the extraction section extracts a pixel with a maximum or minimum image value on the radial ray.

8. The apparatus according to claim 6,
wherein the extraction section excludes a predetermined range from the axis from an extraction range of the pixels on the sectional image.

9. The apparatus according to claim 6,
wherein the creation section creates image data in which the medical device is cut from the opposite side of a central portion of the organ of the subject body.

10. The apparatus according to claim 6,
wherein the creation section colorizes the pixel value and distributes the result in the flat surface region.

11. The apparatus according to claim 6, further comprising:
a display section that displays the created image together with the image of the three-dimensional region of the medical device.

12. The apparatus according to claim 6, further comprising:
a display section that displays information on the distance corresponding to the specific position on the created image.

13. The apparatus according to claim 6, further comprising:
a display section that, when the distance deviates from a reference value, displays a difference between the distance and the reference value.

14. The apparatus according to claim 13,
wherein the reference value is set on the basis of the average or deviation of the distances detected in the plurality of sectional images.

15. The apparatus according to claim 6, further comprising:
a display section that displays information on the area of a specific portion on the created image.

16. The apparatus according to claim 6, further comprising:
a display section that, when the area of a specific portion of an image of the medical device on the created image deviates from a reference value, displays a difference between the area and the reference value.

17. The apparatus according to claim 16,
wherein the reference value is set on the basis of the average or deviation of the areas detected in the plurality of sectional images.

* * * * *